United States Patent
Sturgess

(10) Patent No.: US 9,331,475 B2
(45) Date of Patent: May 3, 2016

(54) CORE

(75) Inventor: Jonathan Peter Sturgess, Great Bridgeford (GB)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/813,887

(22) PCT Filed: Aug. 3, 2010

(86) PCT No.: PCT/EP2010/061258
§ 371 (c)(1),
(2), (4) Date: Feb. 1, 2013

(87) PCT Pub. No.: WO2012/016586
PCT Pub. Date: Feb. 9, 2012

(65) Prior Publication Data
US 2013/0141202 A1 Jun. 6, 2013

(51) Int. Cl.
| H01F 21/08 | (2006.01) |
| H01F 27/24 | (2006.01) |
| H01F 21/00 | (2006.01) |
| H02H 9/02 | (2006.01) |
| H01F 38/02 | (2006.01) |
| H01F 3/02 | (2006.01) |
| H01F 3/10 | (2006.01) |

(52) U.S. Cl.
CPC ............... *H02H 9/021* (2013.01); *H01F 3/10* (2013.01); *H01F 38/023* (2013.01); *H01F 3/02* (2013.01); *H01F 2003/103* (2013.01)

(58) Field of Classification Search
CPC ........... H01F 38/023; H01F 3/10; H01F 3/02; H01F 2003/103; H02H 9/021
USPC .......... 336/155, 234, 110, 212, 178; 335/296, 335/297, 302, 281, 216, 229; 320/128; 429/72
See application file for complete search history.

(56) References Cited

U.S. PATENT DOCUMENTS

| 2,774,935 A | * | 12/1956 | Bruyning et al. | ............. 323/330 |
| 2,869,050 A | * | 1/1959 | Van Urk et al. | ............... 335/229 |
| 6,137,388 A | * | 10/2000 | Saravolac | ..................... 505/211 |

(Continued)

FOREIGN PATENT DOCUMENTS

| CN | 101290828 A | 10/2008 |
| EP | 0156016 A2 * | 10/1985 |

(Continued)

OTHER PUBLICATIONS

International Search Report and Written Opinion in PCT/EP2010/061258, dated Jul. 5, 2011.

(Continued)

*Primary Examiner* — Mangtin Lian
(74) *Attorney, Agent, or Firm* — Nixon Peabody LLP; Robert E. Krebs

(57) ABSTRACT

A magnetic fault current limiter core (10*a*) comprising at least one first magnetic element (12) and at least one second magnetic element (14), the magnetic elements (12,14) being arranged to define a substantially parallel array of magnetic elements (12,14), the or each first magnetic element (12) including a soft magnetic material and the or each second magnetic element (14) including a hard magnetic material, wherein the or each soft magnetic material in a non-saturated state has a higher magnetic permeability than the or each hard magnetic material.

11 Claims, 5 Drawing Sheets

(56) References Cited

U.S. PATENT DOCUMENTS

| | | | |
|---|---|---|---|
| 6,885,272 B1* | 4/2005 | Piaskowski et al. | 336/110 |
| 8,344,830 B2* | 1/2013 | Petzold et al. | 335/6 |
| 2004/0134565 A1 | 7/2004 | Sun et al. | |
| 2007/0041138 A1* | 2/2007 | Niayesh et al. | 361/93.1 |

FOREIGN PATENT DOCUMENTS

| | | | |
|---|---|---|---|
| GB | 2415833 A | | 1/2006 |
| JP | 2002-118956 | | 4/2002 |
| JP | 2003-009386 A | * | 1/2003 |
| JP | 2003197436 A | | 7/2003 |
| JP | 2005-159027 | | 6/2005 |
| WO | WO 2005-010902 A1 | * | 2/2005 |

OTHER PUBLICATIONS

Rasolonjanahary et al, "Design and Construction of a Magnetic Fault Current Limiter", The 3rd IET International Conference on Power Electronics, Machines and Drives, 2006, Mar. 2006, pp. 681-685.

Translation of JP2003197436.

Office Action in Japanese patent application No. 2013-522110, dated Mar. 4, 2014.

Office Action issued in CN Patent Application No. 201080069461.4 dated Apr. 10, 2015, including partial English translation, 7 pages.

* cited by examiner

CORE

CROSS-REFERENCE TO RELATED PATENT APPLICATION

The present application is a National Stage Application of International Application No. PCT/EP2010/061258 entitled "A Core" filed Aug. 3, 2010, the contents of which is incorporated herein by reference in its entirety.

This invention relates to a magnetic fault current limiter core and its use in a magnetic fault current limiter.

When operating any electrical apparatus, the electrical current flowing through the apparatus is typically maintained within a predetermined current rating of the electrical apparatus. However, fault or other abnormal operating conditions in the electrical apparatus may lead to the development of a high fault current exceeding the current rating of the electrical apparatus. For example, during operation of power transmission networks, voltage source converters may be vulnerable to DC side faults that present a short circuit with low impedance across the DC power transmission lines or cables. Such faults can occur due to damage or breakdown of insulation, movement of conductors or other accidental bridging between conductors by a foreign object.

The development of high fault current may not only result in damage to the electrical apparatus components, but also result in the electrical apparatus being offline for a period of time. This results in increased cost of repair and maintenance of damaged electrical apparatus hardware, and inconvenience to end users relying on the working of the electrical apparatus.

The adverse effects may be prevented by limiting the magnitude of the high fault current using a current limiter.

A known solution for a current limiter is in the form of a magnetic fault current limiter. The magnetic fault current limiter behaves like a variable inductor, which presents low impedance during normal operating conditions and high impedance during fault conditions which results in the development of high fault current in an associated power system. In magnetic fault current limiters that employ permanent magnet material, the magnetic flux passes through the permanent magnet material during normal operating conditions when the associated power system is in a fault-free state, and during fault conditions.

The passing of the magnetic flux through the permanent magnet material results in induced eddy currents and magnetic hysteresis. This not only results in power losses in the current limiter, but also leads to a rise in temperature of the permanent magnet material, which is undesirable because permanent magnet materials may suffer a decrease in performance above a specific temperature.

The size of induced eddy currents can be reduced by subdividing a single block of the permanent magnet material into a plurality of thin plates. Each of these plates may be coated with a thin, electrically insulating material and are then joined together via mechanical and/or adhesive means. The relatively smaller cross-section of each plate reduces the circulation of the induced eddy currents and thereby minimises the size of the induced eddy current.

The magnetic flux flowing through the permanent magnet material may be kept relatively low to reduce hysteresis losses because permanent magnet material experiences a larger degree of magnetic hysteresis as the magnetic flux density increases. This approach however means that the magnetic fault current limiter will be unsuitable for use above a specific level of electrical current, and thus limits the operating range of the limiter.

The heating effect of hysteresis losses in the permanent magnet material can be reduced by adding a cooling system to the magnetic fault current limiter. The cooling system however not only forms an additional source of power loss but also decreases device reliability due to the possible breakdown of the cooling system and its various components such as detection and control equipment, and auxiliary power supplies. The presence of the cooling system also leads to increased hardware costs, size and weight.

Alternatively, the permanent magnet material may be designed to adopt a topology, such as a large surface area, that encourages natural cooling. The permanent magnet material would however need to occupy a large amount of space so as to be sufficiently cooled during the operation of the magnetic fault current limiter.

JP 2003-197 436 A discloses a magnetic fault current limiter core comprising first magnetic elements including a soft magnetic material and second magnetic element including a hard magnetic material. The magnetic elements are arranged to define a substantially parallel array of magnetic elements.

GB 2 415 833 A relates to the use of permanent magnets in magnetic circuits such as fault current limiters for alternating currents. The permanent magnet arrangement comprises a plurality of permanent magnets connected in parallel with each other.

The article "Design and Construction of a Magnetic Fault Current Limiter" by J.-L. Rasolonjanahary et al. discloses a fault current limiter using permanent magnets. The article relates to an ideal fault current limiter for series connection having low impedance to currents up to the rated circuit but high impedance to fault current.

US 2004/0 134 565 relates to a process of self-assembling multi-component or core-shell structured magnetic nanoparticles into nanocomposites. More particularly, it relates to a process of self-assembling magnetic nanocomposites that include magnetically hard and soft phases, which are exchange-coupled, and that possess energy products significantly higher than single-phase materials.

According to an aspect of the invention, there is provided a magnetic fault current limiter core comprising at least one first magnetic element and at least one second magnetic element, the magnetic elements being arranged to define a substantially parallel array of magnetic elements, the or each first magnetic element including a soft magnetic material and the or each second magnetic element including a hard magnetic material, wherein the or each soft magnetic material in a non-saturated state has a higher magnetic permeability than the or each hard magnetic material.

The provision of a substantially parallel array of first and second magnetic elements results in a magnetic fault current limiter core with reduced hysteresis losses because the amount of magnetic flux flowing through the hard magnetic material during normal operation of the magnetic fault current limiter is minimised.

In use, when a coil is wound around the core to form a magnetic fault current limiter, the substantially parallel arrangement of the first and second magnetic elements and the higher magnetic permeability of the non-saturated soft magnetic material allow the majority of the magnetic flux to flow preferentially through the soft magnetic material during normal operating conditions of an associated electrical circuit. This means that a minimal amount of magnetic flux passes through the hard magnetic material during normal operating conditions. This leads to a decrease in hysteresis losses in the core because the soft magnetic material exhibits lower levels of magnetic hysteresis than the hard magnetic material.

In the event of a fault or other abnormal operating condition resulting in high fault current in the associated electrical circuit, the switch of the flow path of the magnetic flux to the hard magnetic material leads to high impedance in the coil, which acts to limit the fault current. Although this change in magnetic flux flow path results in high levels of magnetic hysteresis, the magnetic flux only flows through the hard magnetic material for short periods of time. Consequently the resulting hysteresis losses in the hard magnetic material are kept at a minimum.

The substantially parallel arrangement of the first and second magnetic elements therefore minimises the amount of magnetic flux flowing through the hard magnetic material during normal operation of the magnetic fault current limiter and thereby reduces hysteresis losses in the magnetic fault current limiter core.

In addition, the substantially parallel arrangement of the first and second magnetic elements also means that the control of the flow of magnetic flux through the magnetic fault current limiter is passive in nature and does not require additional control in the form of detection and/or switching equipment. This not only minimises hardware size, weight and costs, but also increases reliability of the current limiter by removing the risk of breakdown of the associated detection and/or control equipment.

Preferably at least one first magnetic element is separated from at least one neighbouring second magnetic element by an insulator. The or each insulator may be an air gap or a solid non-conducting material such as an adhesive, varnish, mica or other similar material.

In embodiments of the invention, the magnetic fault current limiter core may further include a plurality of first magnetic elements and/or a plurality of second magnetic elements wherein the magnetic elements are arranged to form alternating primary layers of first and second magnetic elements.

In other embodiments, at least one first magnetic element and/or at least one second magnetic element may include a plurality of secondary layers of magnetic material, each secondary layer being separated from the or each neighbouring secondary layer by an insulator.

The provision of primary and/or secondary layers of magnetic elements helps to provide a magnetic fault current limiter core in which the power losses resulting from the creation of eddy currents are reduced. The magnitude of any eddy currents induced in the magnetic elements when a changing flux flows through the magnetic elements is greatly reduced by the relatively small cross-section of each primary and/or secondary layer of first and/or second magnetic elements, and their electrical isolation one from another, which together restrict the circulation of the eddy currents.

The magnetic fault current limiter core may include at least one magnetic element having a hollow bore wherein a portion of at least one first magnetic element is housed within a hollow bore of a second magnetic element having a hollow bore and/or a portion of at least one second magnetic element is housed within a hollow bore of a first magnetic element.

The magnetic fault current limiter core also may include at least one magnetic element having a hollow and sealed interior, wherein at least one first magnetic element is housed within a hollow and sealed interior of a second magnetic element and/or at least one second magnetic element is housed within a hollow and sealed interior of a first magnetic element.

In embodiments of the invention each magnetic element may be a rod or bar. In other embodiments, the cross-section of each magnetic element may be circular, oval or polyhedral in shape.

The structure of the magnetic fault current limiter core may vary depending on the requirements of the application associated with the magnetic fault current limiter.

Preferably in a fault current limiter core in which at least one first magnetic element is separated from at least one neighbouring second magnetic element by an air gap, at least one such air gap is filled with electrically insulating material.

The use of electrically insulating material in this manner not only provides electrical insulation between neighbouring magnetic elements, but also provides a supporting structure to hold neighbouring magnetic elements in place.

According to a second aspect of the invention, there is provided a magnetic fault current limiter comprising a magnetic fault current limiter core according to any of the above mentioned embodiments and at least one electrical conductor wound around a portion of the or each core to define a coil.

The structure of the current limiter is straightforward to manufacture and easily adapted to fit into any apparatus requiring one or more current limiters.

In embodiments of the invention, the or each electrical conductor may be wound around the first and second magnetic elements.

Winding the or each electrical conductor around both first and second magnetic elements allows the generated magnetic field to have a greater effect on the magnetic elements, and thereby improves the efficiency of the current limiter in controlling the flow path of the magnetic flux and limiting fault current.

Preferably, in use, the or each electrical conductor carries an alternating current.

The or each coil is preferably operably connected in use to one or more electrical circuits. In such embodiments, the or each coil presents an impedance to minimise a fault current created by a fault, in use, in an electrical circuit.

The current limiter may be used to minimise fault current in one or more associated electrical circuits during fault conditions or other abnormal operating conditions so as to prevent damage to the or each associated electrical circuit.

In other embodiments, the or each coil may be in the form of a solenoid or a toroid so to provide a uniform and controlled magnetic field.

Preferred embodiments of the invention will now be described, by way of non-limiting examples, with reference to the accompanying drawings in which.

Figure 1:
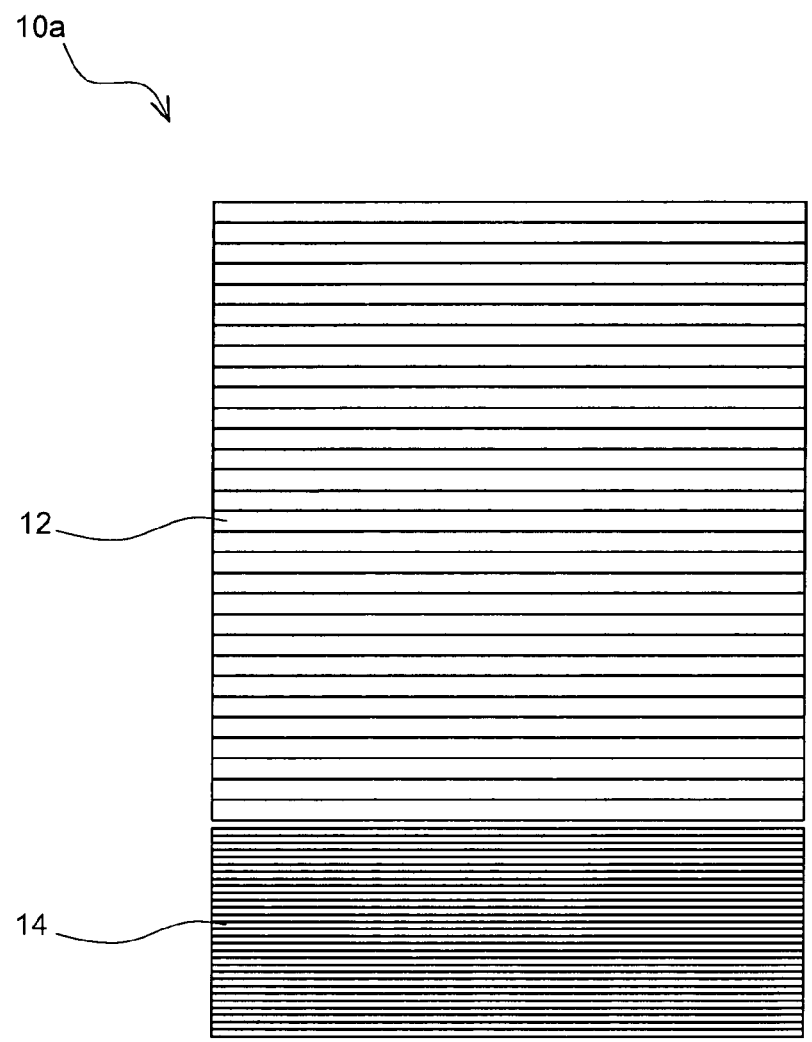
FIG. 1 shows a magnetic fault current limiter core according to a first embodiment of the invention.

A magnetic fault current limiter core 10*a* according to a first embodiment of the invention is shown in FIG. 1.

The magnetic fault current limiter core 10*a* comprises a first magnetic element 12 and a second magnetic element 14 arranged to define a substantially parallel array of magnetic elements 12,14.

Each first magnetic element 12 includes a plurality of secondary layers of soft magnetic material. Preferably the soft magnetic material is electrical steel, which has high magnetic permeability and exhibits low hysteresis losses.

Each secondary layer may be coated with a thin, electrically insulating material to provide electrical insulation between neighbouring secondary layers. These coated secondary layers may be joined together mechanically and/or using adhesive to form the first magnetic element 12. It is envisaged that in embodiments of the invention, each secondary layer may be separated from each neighbouring secondary layer by an air gap, and in some instances at least one such air gap may be additionally filled with electrically insulating material.

The provision of secondary layers reduces power losses associated with eddy currents induced in the magnetic fault current limiter core. This is because the magnitude of any eddy currents induced in the magnetic elements when a changing flux flows through the magnetic fault current limiter core is greatly reduced by the relatively small cross-section of each secondary layer, which greatly reduces the circulation of the eddy currents.

In addition, the electrical isolation of the secondary layers from one another restricts the circulation of eddy currents.

The second magnetic element 14 includes a hard magnetic material and is separated from the first magnetic element 12 by an air gap, which, in other embodiments, may be filled with electrically-insulating material.

Figure 2:
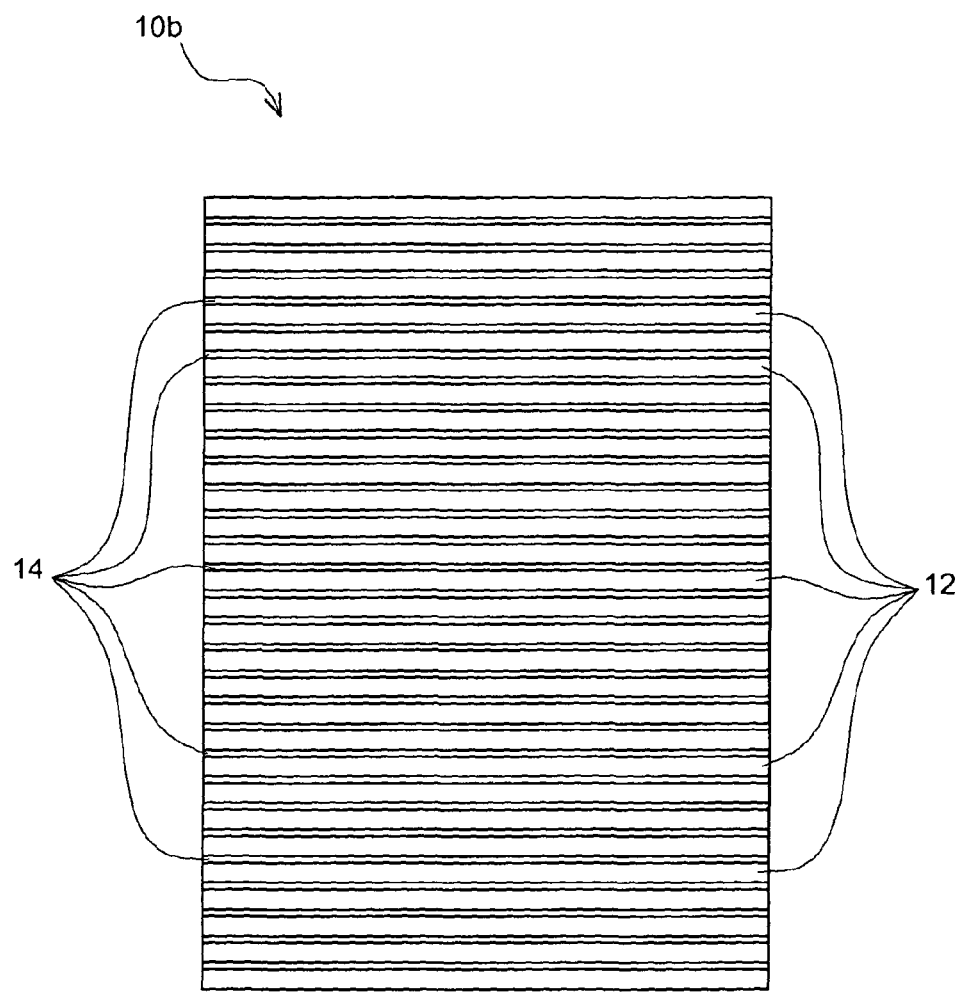
FIG. 2 shows a magnetic fault current limiter core according to a second embodiment of the invention.
Figure 3:
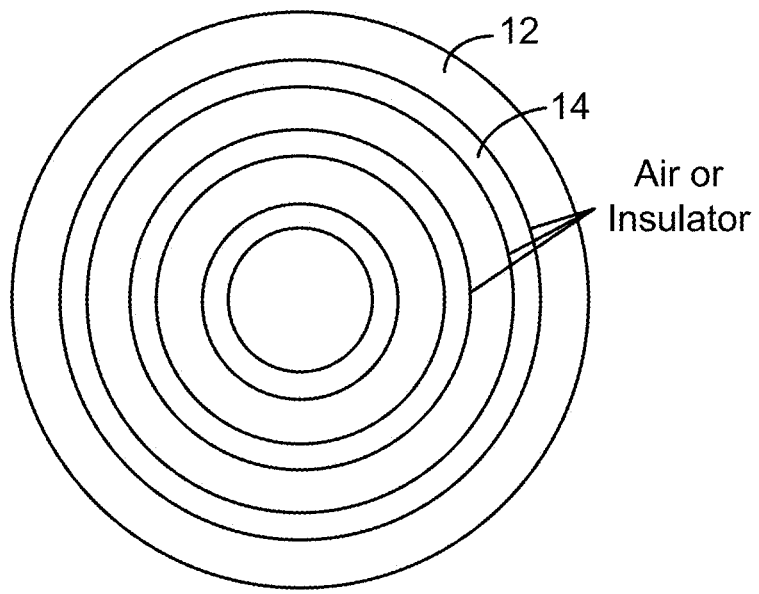
FIG. 3 shows a circular cross-section of a magnetic element which has a hollow bore.
Figure 5:
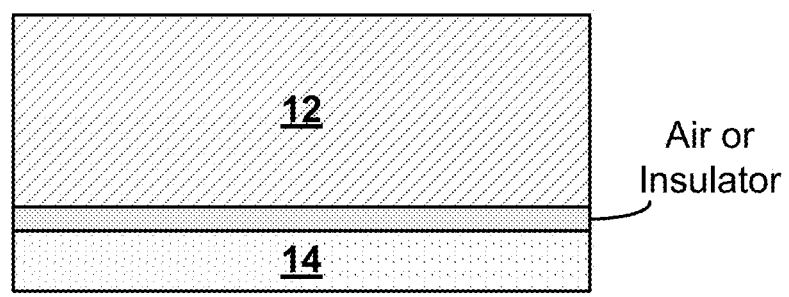
FIG. 5 is a cross-section in which insulator- or air-occupied gap is labeled.
Figure 4:
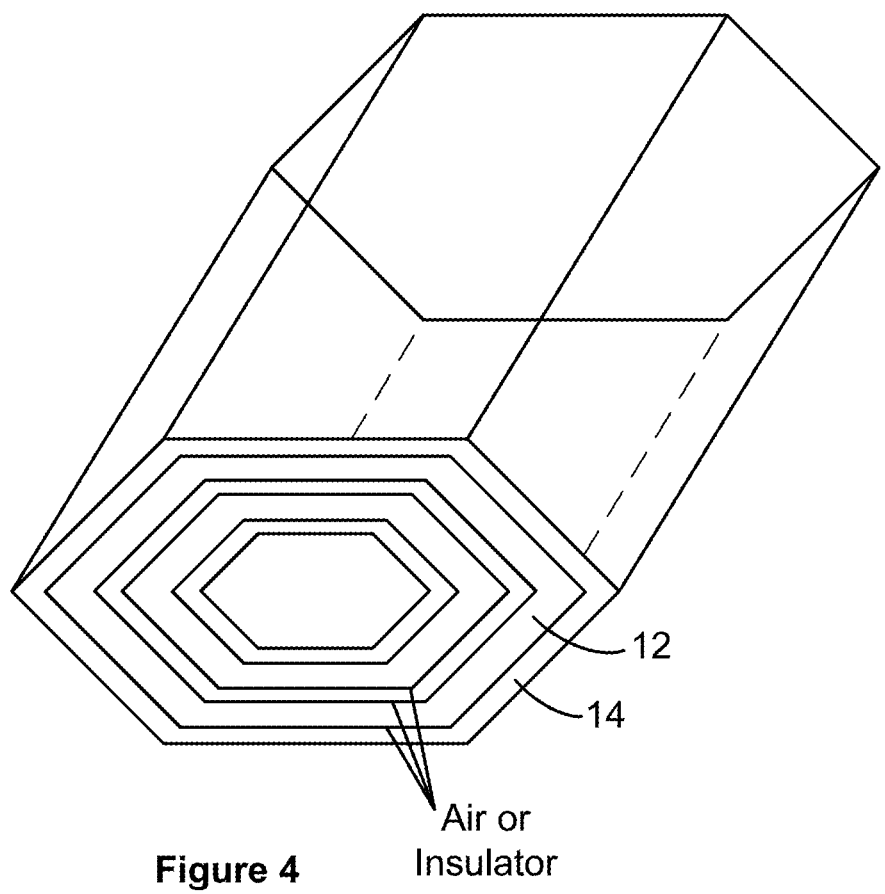
FIG. 4, shows a cross-section of a magnetic element which has a hollow and sealed interior.

A magnetic fault current limiter core 10b according to a second embodiment of the invention is shown in FIG. 2.

The magnetic fault current limiter core 10b comprises a plurality of first magnetic elements 12 and a plurality of second magnetic elements 14, these magnetic elements being arranged to form alternating primary layers of first and second magnetic elements 12,14.

Each primary layer may be coated with electrically insulating material to provide electrical insulation between neighbouring primary layers. As outline above, these coated primary layers may be joined together mechanically and/or using adhesive to form the magnetic fault current limiter core. It is envisaged that in embodiments of the invention, each primary layer may be separated from each neighbouring primary layer by an air gap, and in some instances at least one such air gap may be additionally filled with electrically insulating material.

The thickness of each of the second magnetic elements 14 may be thicker than that of each of the first magnetic elements 12 due to the larger electromagnetic skin depth of hard magnetic materials.

It is envisaged that, in embodiments of the invention, the magnetic fault current limiter core may comprise any number of first and second magnetic elements 14 and/or at least one of the first and/or second magnetic elements 14 may include a plurality of secondary layers of the respective magnetic material.

In other embodiments, at least one of either or both of the first and second magnetic elements 12,14 may have a hollow bore so that a portion of at least one first magnetic element 12 is housed within a hollow bore of a second magnetic element 14 having a hollow bore and/or a portion of at least one second magnetic element 14 is housed within a hollow bore of a first magnetic element 12.

In further embodiments, at least one of either or both of the first and second magnetic elements 12,14 may have a hollow and sealed interior, wherein at least one first magnetic element 12 is housed within a hollow and sealed interior of a second magnetic element 14 and/or at least one second magnetic element 14 is housed within a hollow and sealed interior of a first magnetic element 12.

Preferably each magnetic element is a rod or bar, and/or the cross-section of each magnetic element is circular, oval or polyhedral in shape.

Figure 6:
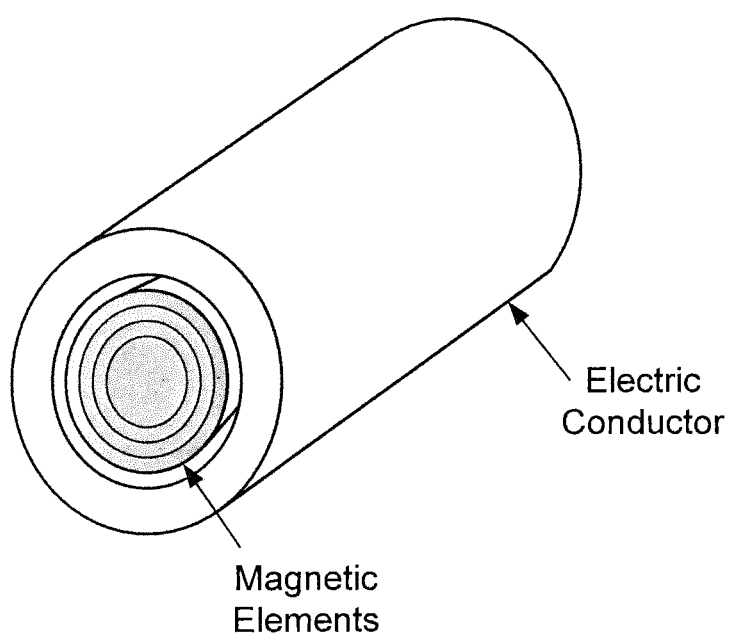
FIG. 6 is an isometric view showing and electric conductor encircling the magnetic elements.

To form a magnetic fault current limiter, one or more electrical conductors, e.g. electrically conductive wires, may be wound around a portion or the whole of the magnetic fault current limiter core 10a, 10b to define one or more coils, as seen in FIG. 6. Preferably the or each electrically conductive wire is wound around the first and second magnetic elements so as to allow the magnetic hysteresis in the hard magnetic material to have a greater effect on the coil impedance, and thereby improve the efficiency of the current limiter.

The or each coil and the core 10a, 10b forms a magnetic fault current limiter which, in use, acts to limit or extinguish fault current in an associated electrical circuit during fault conditions or other abnormal operating conditions.

In use, the or each coil carries an alternating current, which may take the form of a sinusoidal waveform or other types of waveforms. As such, the current limiter may be operably associated with one or more electrical circuits carrying alternating current such as power converters and electric motors.

During operation of the associated electrical circuit, current flows through the associated electrical circuit and through the coil wound around the core 10a, 10b. The flow of current through the coil results in the generation of magnetic flux flowing through the core 10a, 10b inside the coil, which leads to magnetization and demagnetization of the magnetic materials of the first and second magnetic elements 12,14 as the alternating current passes through the coil.

For the purposes of this specification, positive and negative terms refer to the direction of the magnetizing force and the magnetic flux density.

In order to generate a first magnetic field about the coil, the alternating current flows through the coil in a forward direction. The increase in magnitude of the alternating current in the forward direction leads to a corresponding increase in magnetizing force in a positive direction, which in turn leads to a development of a positive magnetic flux density within the magnetic material of the core 10a, 10b. The positive magnetic flux density reaches its maximum value at the peak value of the alternating current in the forward direction.

After arriving at its peak value in the forward direction, the alternating current begins to decrease to zero current, which leads to a corresponding decrease in magnetizing force in the positive direction. At zero current, the magnetizing force has a zero value.

The decrease in magnetizing force in the positive direction leads to a decrease in the positive magnetic flux density within the magnetic material. The magnetic material however may retain a positive magnetic flux density at zero alternating current and magnetizing force. This is because application of a magnetizing force to the magnetic material leads to magnetization of the magnetic material, which may remain magnetized even after the magnetizing force is completely removed. The retention of magnetism in the magnetic material after removal of the magnetizing force is known as permanent magnetism.

In order to generate a second magnetic field about the coil, the alternating current flows through the coil in a reverse direction. The increase in magnitude of the alternating current in the reverse direction leads to a corresponding increase in magnetizing force in the negative direction. The permanent magnetism in the magnetic material however means that the magnetic flux density in the magnetic material will remain positive until the magnetizing force in the negative direction is sufficiently large to demagnetize the magnetic material.

After the magnetic material is demagnetized, further increases in magnitude of the alternating current in the reverse direction and thereby the magnetizing force in the negative direction leads to a development of a negative magnetic flux density within the magnetic material. The negative magnetic flux density within the magnetic material reaches its maximum negative value at the peak value of alternating current in the reverse direction.

During the change of flow of the alternating current from the reverse direction to the forward direction, the magnetic material retains a negative magnetic flux density until the magnetizing force in the positive direction is sufficiently large to demagnetize the magnetic material. After demagnetization of the magnetic material, further increases in magnitude of the alternating current in the forward direction, and thereby the magnetizing force in the positive direction, leads to a development of a positive magnetic flux density within the magnetic material up to its maximum value at the peak value of the alternating current in the forward direction.

The cyclic behaviour mentioned above defines a closed hysteresis loop which describes a relationship between the magnetizing force and the magnetic flux density. The shape and size of the magnetic hysteresis loop affects the impedance presented by the coil to the associated electrical circuit.

The impedance of the coil is a function of coil resistance and reactance.

Additional energy is required to overcome the magnetic hysteresis of the magnetic material. The expenditure of this additional energy contributes to an increase in coil resistance. Coil resistance therefore increases with the level of magnetic hysteresis in the core.

Coil reactance is a function of coil inductance, which in turn is proportional to the magnetic material's magnetic permeability. The magnetic permeability is equal to the rate of change of magnetic flux density with magnetizing force, which is dependent on the shape and size of the magnetic hysteresis loop. A wide hysteresis loop leads to steep rate of changes of magnetic flux density with magnetizing force, and thereby higher values of magnetic permeability, as the alternating current approaches its peak positive or negative value. Higher values of magnetic permeability lead to increases in coil inductance and thereby coil reactance.

During normal operating conditions, the soft magnetic material of the or each first magnetic element 12 has a higher magnetic permeability than the hard magnetic material of the or each second magnetic element 14 when the soft magnetic material is in a non-saturated state. This difference in magnetic permeability therefore allows the majority of the magnetic flux to flow preferentially through the soft magnetic material of the or each first magnetic element 12 of the core 10a, 10b and thereby minimise the amount of magnetic flux flowing through the hard magnetic material of the or each second magnetic element 14 of the core.

This leads to a reduction in power losses associated with hysteresis in the core 10a, 10b during normal operation of the associated electrical circuit because soft magnetic materials exhibit lower levels of magnetic hysteresis, and therefore a narrower hysteresis loop, than hard magnetic materials. The low levels of magnetic hysteresis exhibited by the soft magnetic materials coupled with the relatively low current levels also result in the or each coil presenting low impedance to the associated electrical circuit and thereby having minimal influence on the flow of the alternating current during normal operation of the associated electrical circuit.

In the event of a fault or other abnormal operating condition resulting in high fault current in the associated electrical circuit, the magnetic flux levels in the core 10a, 10b will rise. The magnetic flux will continue to flow preferentially through the or each first magnetic element 12 until the soft magnetic material of the or each first magnetic element 12 reaches saturation. Saturation of the or each soft magnetic material causes the magnetic relative permeability of the respective first magnetic element 12 to drop towards one.

At this stage the hard magnetic material of the or each second magnetic element 14 has a higher magnetic permeability than the saturated soft material of the or each first magnetic element 12. This causes the magnetic flux generated by the current-carrying coil to flow preferentially through the hard magnetic material of the or each second magnetic element 14. This change in medium for magnetic flux flow from the or each saturated first magnetic element 12 to the or each second magnetic element 14 leads to a change in coil impedance which acts to restrict the fault current in the associated electrical current.

This is because the higher levels of magnetic hysteresis in hard magnetic material coupled with the relatively high fault current levels leads to a wider magnetic hysteresis loop area and therefore steeper rates of change of magnetic flux of magnetic flux density with magnetizing force, as the high fault current approaches its positive or negative peak value. This leads to an increase in coil resistance and reactance as outlined above. As such, the coil presents high impedance to the associated electrical circuit to limit the peak values of the fault current during fault or other abnormal operating conditions.

The provision of hard magnetic material in the core 10a, 10b improves the efficiency of the magnetic fault current limiter when it comes to limiting the fault current, because of higher coil impedance resulting from the higher levels of magnetic hysteresis in hard magnetic material in comparison to soft magnetic materials. Otherwise, in the absence of the hard magnetic material of the or each second magnetic element 14, the provision of soft magnetic material of the or each first magnetic element 12 leads to a low coil impedance which may be insufficient to limit the fault current.

Preferably the high impedance presented to the associated electrical circuit during fault conditions is such that the peak value of the fault current is kept within the current rating of the associated electrical circuit to protect the various components of the associated electrical circuit.

In embodiments of the invention, the current limiter may be designed to limit the magnitude of the fault current for a short period of time before external circuit breakers are actuated to open the circuit and thereby extinguish the fault current.

Since the magnetic flux only flows through the hard magnetic material of the or each second magnetic element 14 for short periods of time, the resulting hysteresis losses and temperature rise in the hard magnetic material are kept at a minimum.

As such, the provision of a substantially parallel array of first and second magnetic elements 12,14 results in a magnetic fault current limiter core 10a, 10b which, in use, exhibits reduced hysteresis losses and a low temperature rise during operation of the magnetic fault current limiter and therefore can be used in combination with electrical circuits at high levels of electrical current. This therefore leads to a reduction in hardware costs, size and weight since there is no requirement to install a cooling system or utilise a core topology to address the hysteresis losses and temperature rise in the core.

The arrangement also provides a passive way of controlling magnetic flux through the magnetic fault current limiter core 10a, 10b. This may eliminate the need for detection and/or switching equipment to provide active control over the flow of magnetic flux through the core 10a, 10b. The passive nature of operation of the current limiter means that it may be possible to minimise or eliminate the use of detection and/or control equipment normally employed to monitor and control the current within the associated electrical circuit.

Preferably the hard magnetic material of the or each second magnetic element 14 is selected so that the magnetizing force required to achieve saturation in the hard magnetic material is higher than the magnetizing force arising from the fault current. It may be undesirable for the hard magnetic material of the or each second magnetic material 14 to reach saturation because it leads to a reduction of its magnetic permeability, which results in low coil impedance and thereby may result in faulty operation of the current limiter.

The invention claimed is:

1. A fault current limiter for protecting an electric circuit, the fault current limiter comprising first magnetic elements including a soft magnetic material, second magnetic elements including a hard magnetic material, and at least one electrical conductor which encircles both the first and second magnetic elements to define a coil, wherein the first and second magnetic elements are arranged to define a substantially parallel array of magnetic elements in which they are arranged to form alternating primary layers of first and second magnetic elements, wherein each primary layer is coated with an electrically insulating material to provide electrical insulation between neighboring primary layers, wherein the soft magnetic material in a non-saturated state has a higher magnetic permeability than the hard magnetic material, and wherein the soft magnetic material in a saturated state has a lower magnetic permeability than the hard magnetic material, the fault current limiter being configured to operate under normal operating conditions in which the majority of the magnetic flux flows through the soft magnetic material of the first magnetic elements and a minimal amount of the magnetic flux flows through the hard magnetic material of the second magnetic elements, and to operate under fault conditions in which the soft magnetic material of the first magnetic elements is saturated and the magnetic flux flows through the hard magnetic material of the second magnetic elements to thereby prevent the flow of fault current in the electric circuit.

2. A fault current limiter according to claim 1 including at least one magnetic element having a hollow bore wherein a portion of at least one first magnetic element is housed within a hollow bore of a second magnetic element having a hollow bore and/or a portion of at least one second magnetic element is housed within a hollow bore of a first magnetic element.

3. A fault current limiter according to claim 1 including at least one magnetic element having a hollow and sealed interior, wherein at least one first magnetic element is housed within a hollow and sealed interior of a second magnetic element and/or at least one second magnetic element is housed within a hollow and sealed interior of a first magnetic element.

4. A fault current limiter according to claim 1 wherein each magnetic element is a rod or bar.

5. A fault current limiter according to claim 1 wherein the cross-section of each magnetic element is circular, oval or polyhedral in shape.

6. A fault current limiter according to claim 1 in which at least one first magnetic element is separated from at least one neighbouring second magnetic element by an air gap, and wherein at least one such air gap is filled with electrically insulating material.

7. A fault current limiter according to claim 1 wherein in use, the at least one electrical conductor carries an alternating current.

8. A fault current limiter according to claim 1 wherein the coil is operably connected in use to one or more electrical circuits.

9. A fault current limiter according to claim 8 wherein the coil presents an impedance to minimize a fault current created by a fault, in use, in an electrical circuit.

10. A fault current limiter according to claim 1 wherein the coil is in the form of a solenoid or a toroid.

11. The fault current limiter according to claim 1, wherein the second magnetic elements are thicker than the first magnetic elements.

* * * * *